United States Patent
Bhogal et al.

(10) Patent No.: US 8,971,866 B2
(45) Date of Patent: Mar. 3, 2015

(54) AUTOMATICALLY CONNECTING TO A BEST AVAILABLE CALLING DEVICE BASED ON RESOURCE STRENGTH

(75) Inventors: Kulvir S. Bhogal, Fort Worth, TX (US); Lisa Seacat DeLuca, San Francisco, CA (US); Robert R. Peterson, Austin, TX (US); Asima Silva, Holden, MA (US)

(73) Assignee: International Business Machines Corporation, Armonk, NY (US)

( * ) Notice: Subject to any disclaimer, the term of this patent is extended or adjusted under 35 U.S.C. 154(b) by 79 days.

(21) Appl. No.: 13/585,038

(22) Filed: Aug. 14, 2012

(65) Prior Publication Data

US 2014/0051390 A1   Feb. 20, 2014

(51) Int. Cl.
    *H04M 3/42*   (2006.01)
(52) U.S. Cl.
    USPC ............. 455/417; 455/411; 455/445; 379/70; 379/142.07; 379/170; 379/211.02; 379/212.01
(58) Field of Classification Search
    USPC ................. 455/461, 456.1–456.6, 235.1, 411
    See application file for complete search history.

(56) References Cited

U.S. PATENT DOCUMENTS

| 6,584,316 | B1* | 6/2003 | Akhteruzzaman et al. ... 455/445 |
| 7,769,392 | B2 | 8/2010 | Russell |
| 8,068,854 | B2 | 11/2011 | Contractor |
| 8,117,341 | B2 | 2/2012 | Matz |
| 2006/0142012 | A1 | 6/2006 | Kirchhoff et al. |
| 2009/0088180 | A1 | 4/2009 | LaMance et al. |
| 2009/0280817 | A1* | 11/2009 | Chavez et al. ................ 455/445 |
| 2009/0296913 | A1 | 12/2009 | Thomas et al. |
| 2010/0046731 | A1 | 2/2010 | Gisby et al. |
| 2010/0311395 | A1 | 12/2010 | Zheng et al. |
| 2011/0223930 | A1 | 9/2011 | Todd |

OTHER PUBLICATIONS

Wikipedia, "Google Latitude", Published on: Oct. 13, 2011, Wikipedia, the free encyclopedia [online], [retrieved on Aug. 13, 2012]. Retrieved from the Internet <URL: http://en.wikipedia.org/w/index.php?title=Google_Latitude&oldid=455333661>.
Wikipedia, "Google Voice", Published on: Oct. 27, 2011, Wikipedia, the free encyclopedia [online], [retrieved on Aug. 13, 2012]. Retrieved from the Internet <URL: http://en.wikipedia.org/w/index.php?title=Google_Voice&oldid=457654416>.

* cited by examiner

*Primary Examiner* — Olumide T Ajibade Akonai
*Assistant Examiner* — Edward Zhang
(74) *Attorney, Agent, or Firm* — Edward Li

(57) ABSTRACT

A method, computer program product, and computer system for automatically connecting a calling device to a best available calling device based on resource strength. A computer system receives from a first calling device a request for a call to a second calling device and evaluates resource strength of the second calling device. The computer system determines one or more third calling devices, in response to determining that the resource strength of the second calling device is low. The computer system compares resource strength of the one or more third calling devices with that of the second calling device and determines a best available one of the one or more third calling devices. The computer system connects the call by connecting the first calling device and the best available one of the one or more third calling devices.

13 Claims, 5 Drawing Sheets

AUTOMATICALLY CONNECTING TO A BEST AVAILABLE CALLING DEVICE BASED ON RESOURCE STRENGTH

FIELD OF THE INVENTION

The present invention relates generally to telecommunication, and more particularly to automatically connecting a calling device to a best available calling device based on resource strength.

BACKGROUND

Telephone calls connect the calling parties (callers) and the called parties (receivers) through connections over telecommunication networks. Mobile telecommunication devices can be used to make and receive telephone calls over a radio link when callers and receivers move around in wide geographic areas. The mobile telecommunication devices may be connected to a cellular network provided by a service provider and thus may access a public telephone network.

Current information technology allows a user to receive and answer a call from any of many phone numbers. For example, a user may activate a phone number as a Google Voice phone number and add additional phone numbers. Via Google Voice, when a call is received by the Google Voice phone number, all the registered phone numbers with Google Voice can ring simultaneously; a user may receive and answer the call on any of the ringing phones or through a web-based application.

Current information technology allows a mobile phone user to authorize certain people to view their current location. Using a location-aware mobile application, such as Google Latitude, a mobile phone user is able to map the user's cell phone location on Google Maps. The information of the location of a mobile phone user can be accessed by people who have permission to view the information.

SUMMARY

Embodiments of the present invention provide a method, computer program product, and computer system for automatically connecting a calling device to a best available calling device based on resource strength. A computer system receives from a first calling device a request for a call to a second calling device. The computer system evaluates resource strength of the second calling device. The computer system determines one or more third calling devices, in response to determining that the resource strength of the second calling device is low. The computer system compares resource strength of the one or more third calling devices with that of the second calling device. The computer system determines a best available one of the one or more third calling devices. And, the computer system connects the call by connecting the first calling device and the best available one of the one or more third calling devices.

DETAILED DESCRIPTION

Figure 1A:
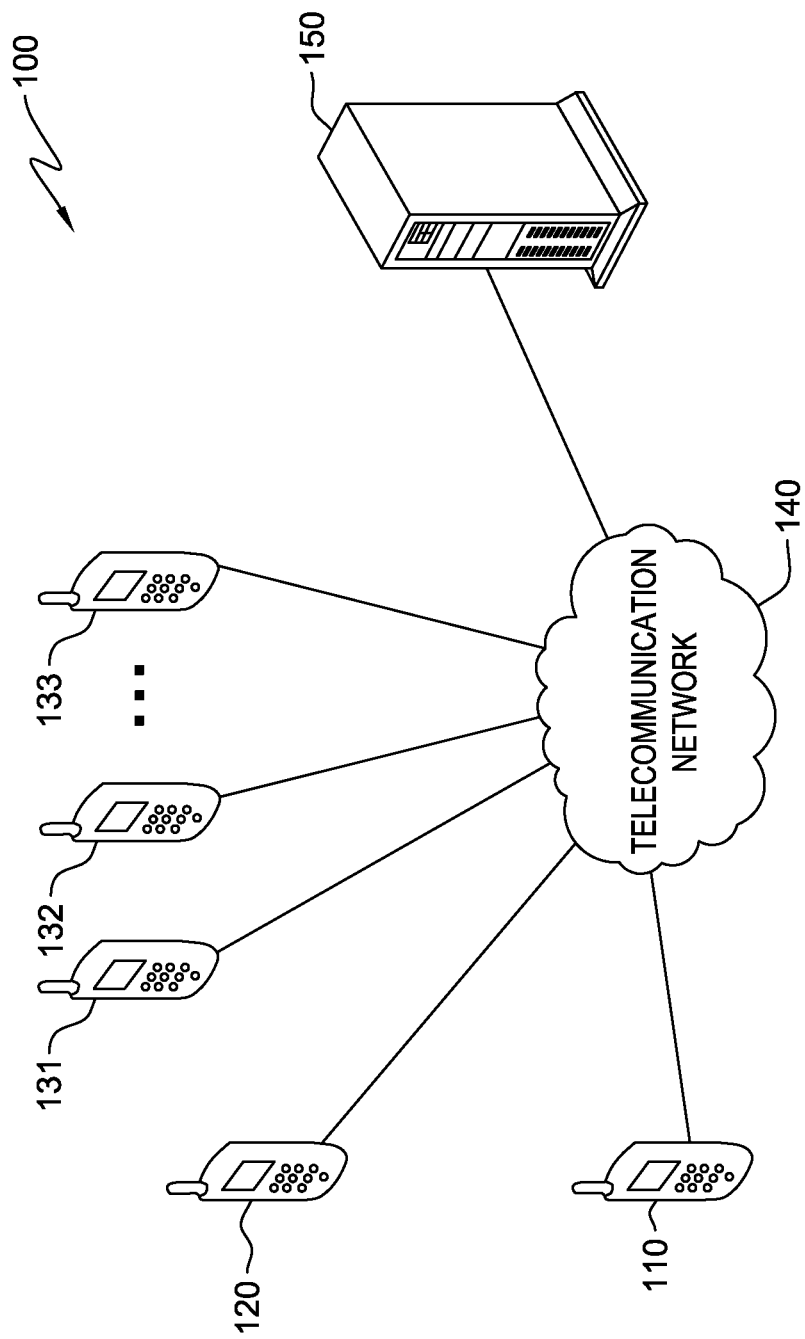
FIGS. 1A and 1B are diagrams illustrating a telecommunication system of calling devices and a service server connected via a telecommunication network, in accordance with an exemplary embodiment of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. The term of "computer readable storage medium" or "one or more computer-readable tangible storage devices", as used in this document, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java®, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1B:
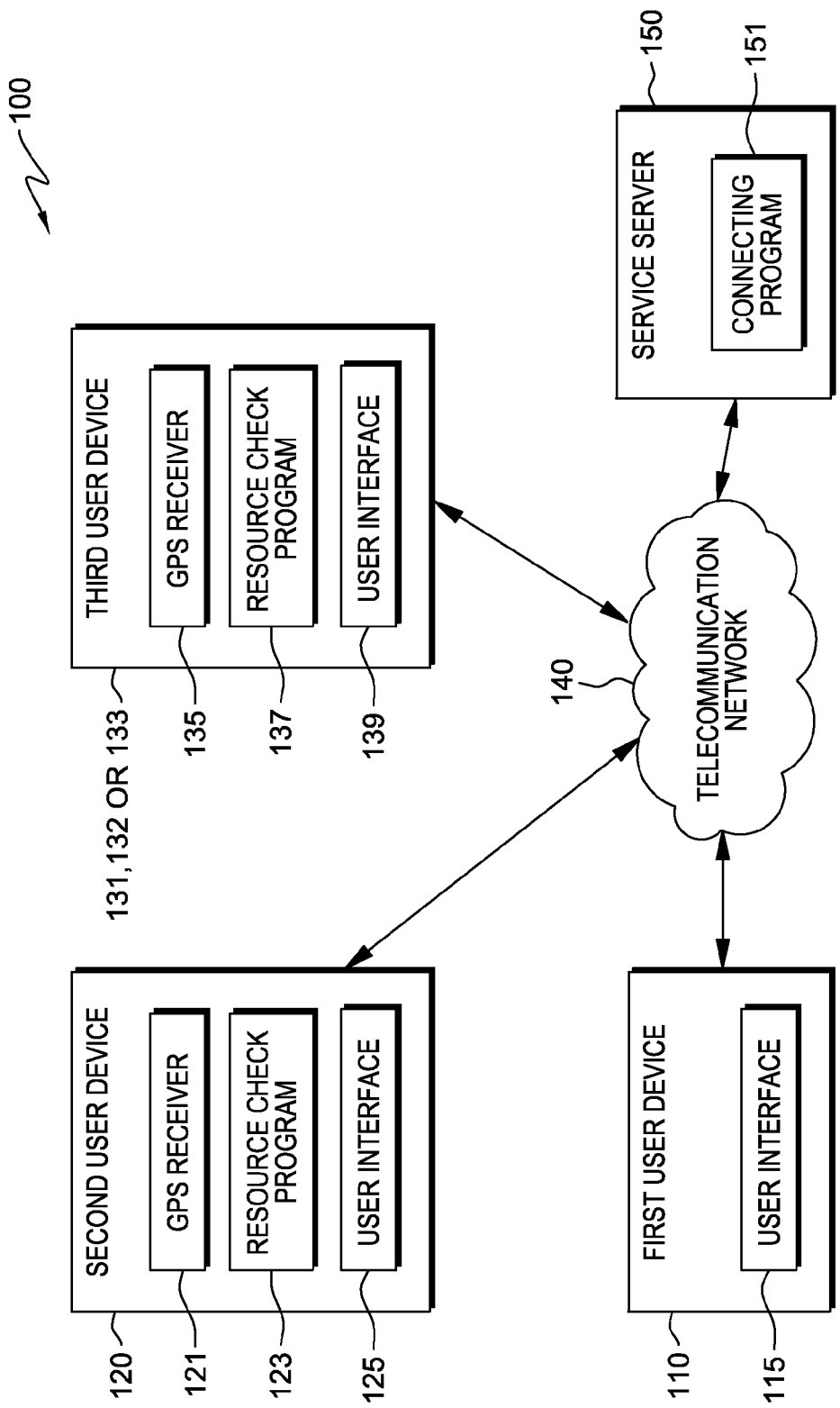

FIGS. 1A and 1B are diagrams illustrating telecommunication system 100 which includes calling devices 110, 120, 131, 132, and 133 and service server 150 connected via telecommunication network 140, in accordance with an exemplary embodiment of the present invention. In telecommunication system 100, calling device 110 is a mobile device of a caller, calling device 120 is a mobile device of a receiver, and calling devices 131, 132, and 133 are one or more mobile devices of third users. The third users are associated with both the caller and the receiver, and calling devices 131, 132, and 133 are in proximity to the receiver. In the exemplary embodiment, any of calling devices 110, 120, 131, 132, and 133 is a mobile device capable of making or receiving a call, such as a regular cellar phone, a smartphone, a tablet computer, a laptop computer, a personal digital assistant (PDA), or any mobile computing device. In other embodiments, any of calling devices 110, 120, 131, 132, and 133 may be a landline telephone, a desktop computing device, or any other computing device capable of making or receiving a call. Service server 150 provides telecommunication services including connecting calls. Service server 150 is hosted by a provider of telecommunication. Telecommunication network 140 is a combination of cellular networks, telephone networks, and computer networks.

Figure 3:
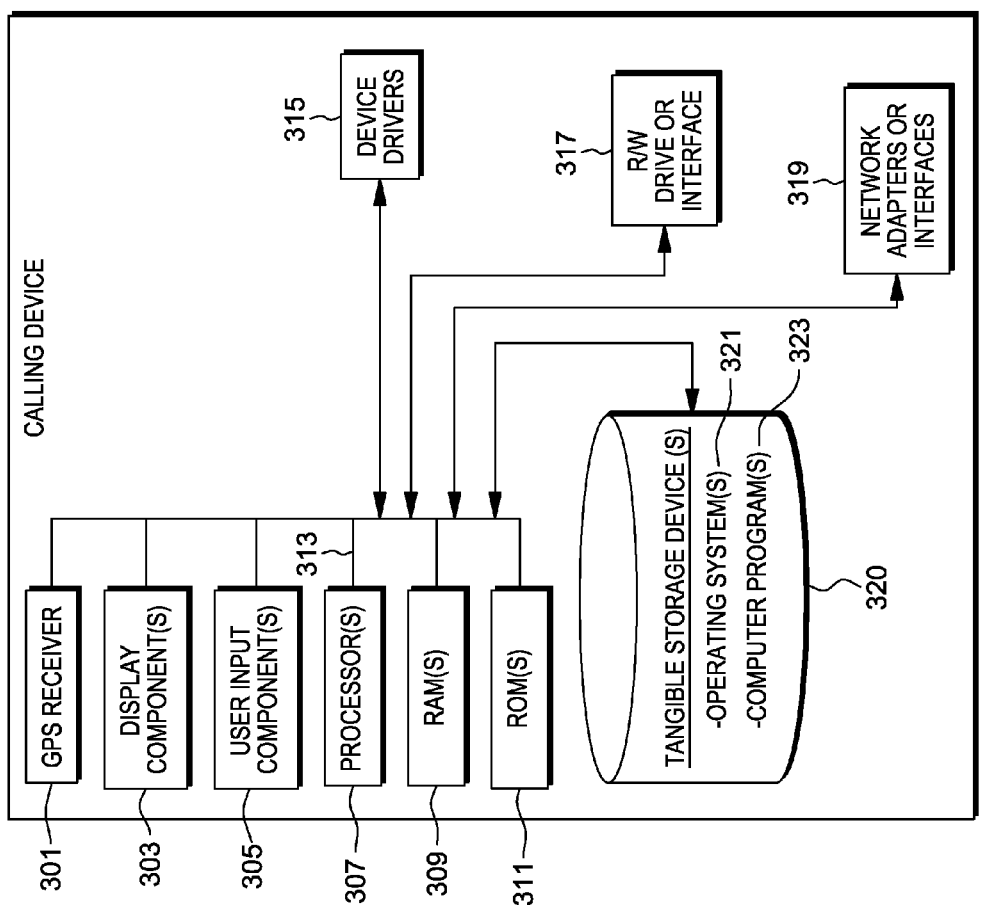
FIG. 3 is a block diagram illustrating internal components of the calling devices presented in FIGS. 1A and 1B, in accordance with an exemplary embodiment of the present invention.

Referring to FIG. 1B, calling device 110, which is a mobile device of a caller, includes user interface 115. User interface 115 includes display component(s) 303 and user input component(s) 305 (which are shown in FIG. 3). Calling device 120, which is a mobile device of a receiver, includes GPS receiver 121, resource check program 123, and user interface 125. User interface 125 also includes display component(s) 303 and user input component(s) 305. Calling devices 131, 132, or 133 which is a mobile device of a third user, includes GPS receiver 135, resource check program 137, and user interface 139. User interface 139 also includes display component(s) 303 and user input component(s) 305.

In the exemplary embodiment, GPS receiver 121 is used to provide location information of receiver's calling device 120, and GPS receiver 135 is used to provide location information of third user's calling device 131, 132, or 133. In other embodiments, location information of a landline telephone is provided by a telephone service provider, and location information of a computing device is provided by a computer network. Service server 150 determines the locations by acquiring the location information sent from calling device 120, 131, 132, and 133. In addition, location information may be acquired through location services (such as Google Latitude).

In the exemplary embodiment, resource check program 123 examines resource strength of receiver's calling device 120, and resource check program 137 examines resource strength of third user's calling device 131, 132, or 133. The information of the resource strength is sent, from calling devices 120, 131, 132, and 133, to service server 150. The resource strength includes strength of signals which are received by receiver's calling device 120 and third users' calling devices 131, 132, and 133, power levels supplied by batteries of calling devices 131, 132, and 133, and/or calling minute availability of a calling plan.

In the exemplary embodiment, user interface 115 on caller's calling device 110, user interface 125 on receiver's calling device 120, and user interface 139 on third calling device 131, 132, or 133 receive and display messages from service server 150. The messages from service server 150 are displayed on display component(s) 303 of calling device 110, 120, 131, 132, or 133. In the exemplary embodiment, user interfaces 115, 125, and 139 send responses to service server 150 from the caller, receiver, and third users, respectively. The responses are input by the caller, receiver, and/or third users through user input component(s) 305 of calling device 110, 120, 131, 132, or 133.

In the exemplary embodiment, service server 150 includes connecting program 151. Connecting program 151, based on evaluation of the resource strength and determination of a best available one of calling devices 131, 132, and 133, automatically connects a call from the caller to the receiver by connecting caller's calling device 110 to the best available one. Functions and operations of connecting program 151 on service server 150 are discussed in greater detail in the following paragraphs with reference to FIG. 2.

Figure 2:
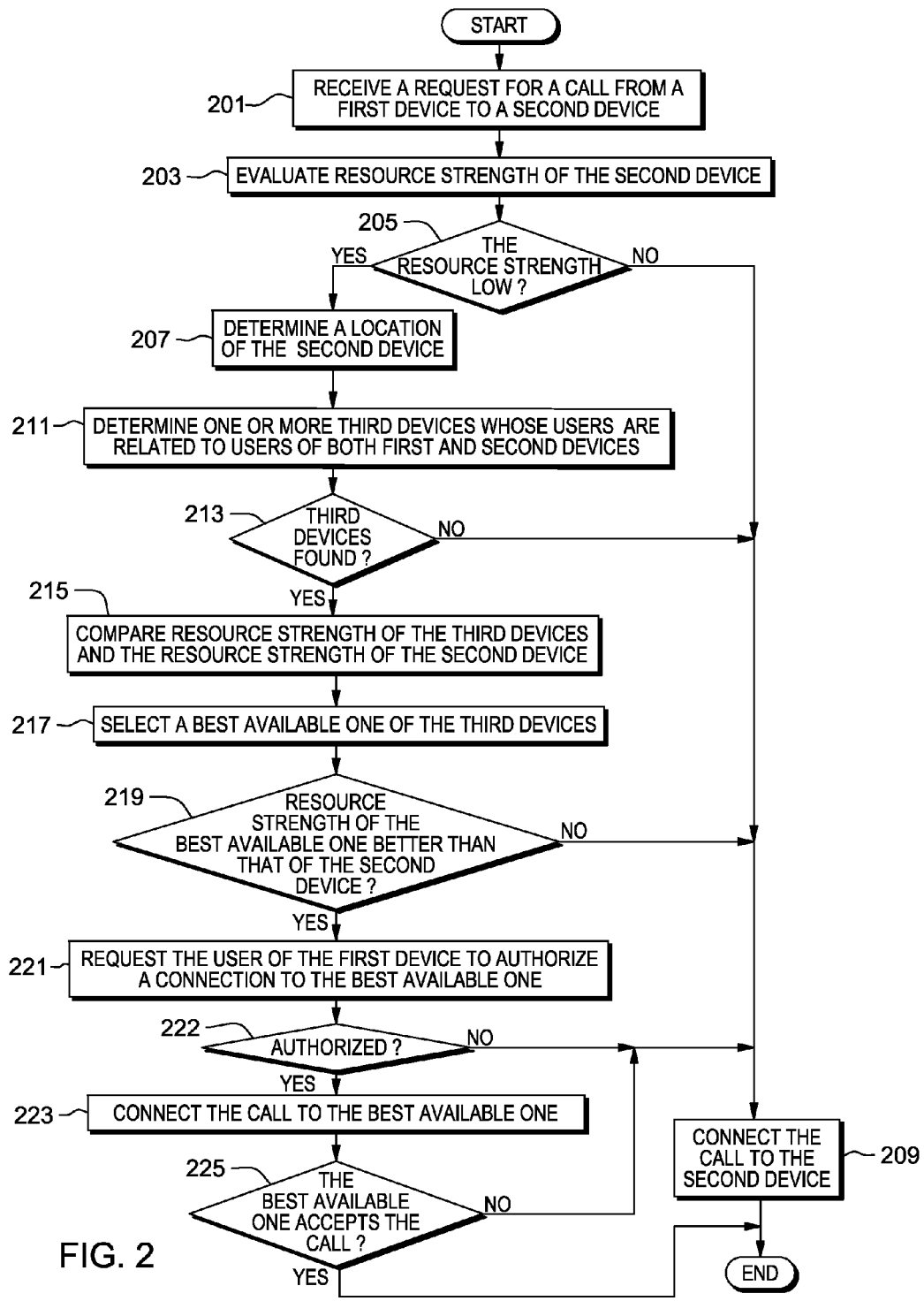
FIG. 2 is a flowchart illustrating operational steps of connecting a call from a caller to a receiver by connecting a caller's calling device to a best available third user's calling device, in accordance an exemplary embodiment of the present invention.

FIG. 2 is a flowchart illustrating operational steps of connecting program 151 in automatically connecting a call from a caller to a receiver by connecting caller's calling device 110 to a best available one of calling devices 131, 132, and 133, in accordance with an exemplary embodiment of the present invention. At step 201, connecting program 151 receives a request for a call from a first calling device (calling device 110) to a second calling device (calling device 120). The first calling device is used by a first user or a caller, and the second calling device is used by a second user or a receiver. At step 203, connecting program 151 evaluates resource strength of the second calling device (calling device 120), in response to receiving information of the resource strength from the second calling device (calling device 120). The resource strength includes the signal strength, the battery power level, and/or the calling minute availability.

Referring to FIG. 2, at decision block 205, connecting program 151 determines whether the resource strength of the second calling device (calling device 120) is low. In response to determining that the resource strength of the second calling device (calling device 120) is not low (NO branch of decision block 205), connecting program 151, at step 209, connects the call to the second calling device (calling device 120) which is used by the receiver (or the second user). In response to determining that the resource strength of the second calling device (calling device 120) is low (YES branch of decision block 205), connecting program 151, at step 207, determines the location of the second calling device (calling device 120) by acquiring the location information.

Referring to FIG. 2, at step 211, connecting program 151 determines one or more third calling devices (calling devices 131, 132, and 133) whose users are third users associated with both the first user (the caller) and the second user (the receiver) and in proximity to the second user (the receiver). Through social networking relationships or organizational charts, connecting program 151 finds the third users associated with both the first user (the caller) and the second user (the receiver). Based on identification of the receiver's location at step 207, connecting program 151 searches the one or more third calling devices (calling devices 131, 132, and 133) which are in proximity to the second device (calling device 120), through Bluetooth, location services (such as Google Latitude), GPS, or last known locations.

Referring to FIG. 2, at decision block 213, connecting program 151 determines whether the one or more third calling devices (calling devices 131, 132, and 133) are found. In response to determining that no third calling devices are found (NO branch of decision block 213), connecting program 151 connects the call to the second calling device (calling device 120) at step 209. In response to determining that the one or more third calling devices are found (YES branch of decision block 213), connecting program 151, at step 215, compares the resource strength of the one or more third calling devices (calling devices 131, 132, and 133) and the resource strength of the second calling device (calling device 120).

Referring to FIG. 2, in response to the comparison of the resource strength at step 215, connecting program 151, at step 217, selects a best available one of the one or more third calling devices (calling devices 131, 132, and 133). In selecting the best available one, connecting program 151 may apply weights on different criteria such as the signal strength, the power levels, the relationships of the calling device users, calling minute availability, and the cost of the call.

Referring to FIG. 2, at decision block 219, connecting program 151 determines whether the resource strength of the best available one of the one or more third calling devices (calling devices 131, 132, and 133) is better than the resource strength of the second calling device (calling device 120). In response to determining that the resource strength of the best available one is not better than the resource strength of the second calling device (NO branch of decision block 219), connecting program 151 connects the call to the second calling device (calling device 120) at step 209. In response to determining that the resource strength of the best available one is better than the resource strength of the second calling device (YES branch of decision block 219), connecting program 151, at step 221, requests the user of the first calling device (calling device 110) to authorize the call from the first calling device (calling device 110) to the best available one of the third calling devices (calling devices 131, 132, and 133). For example, connecting program 151 prompts the first calling device (calling device 110) for the caller to allow the call to the receiver to be connected to the best available one of the one or more third calling devices (calling devices 131, 132, and 133).

Referring to FIG. 2, in response to the first device user's not authorizing the connection to the best available one (NO branch of decision block 222), connecting program 151 connects the call to the second calling device (calling device 120) at step 209. In response to the authorization of the user of the first device or calling device 110 (YES branch of decision block 222), at step 223 connecting program 151 connects the call from the caller to the receiver by connecting the first calling device (calling device 110) to the best available one of the third calling devices (calling device 131, 132, and 133). Alternatively, in other embodiments, when connecting the call to the best available one, connecting program 151 informs the best available one that the call from the caller to the receiver is connected to the best available one. And, connecting program 151 receives a response from the best available one. In the response, the user of the best available one may set some restrictions (for example calling minutes) of the usage of the best available one.

Referring to FIG. 2, at decision block 225, connecting program 151 determines whether the best available one accepts the call. In response to the best available one's accepting the call (YES branch of decision block 225), connecting program 151 finishes its operational steps. In response to the best available one's not accepting the call (NO branch of decision block 225), connecting program 151 connects the call to the second calling device (calling device 120) at step 209.

FIG. 3 is a block diagram illustrating internal components of calling device 110, 120, 131, 132, or 133 presented in FIGS. 1A and 1B, in accordance with an exemplary embodiment of the present invention. Calling device 110, 120, 131, 132, or 133 includes, on one or more buses 313, one or more processors 307, one or more computer-readable RAMs 309, and one or more computer-readable ROMs 311. Calling device 120, 131, 132, or 133 (which are used by the receiver and the third users) has GPS receiver 301. GPS receiver 301 is an optional component on calling device 110 (which is used by the caller). As shown in FIGS. 1A and 1B, calling device 110, 120, 131, 132, or 133 includes user interface 115, 125, or 139. User interface 115, 125, or 139 includes display component(s) 303 and user input component(s) 305. On one or more computer-readable tangible storage device(s) 320 of calling device 110, 120, 131, 132, or 133, there are operating system(s) 321 and computer program(s) 323. Computer program(s) 323 on calling device 120 include resource check program 123, and computer program(s) 323 on calling device 131, 132, or 133 include resource check program 137. Calling device 110, 120, 131, 132, or 133 also includes R/W drive or interface 317 to read from or write to one or more external tangible storage devices, network adapters or interfaces 319 for wired or wireless communication links, and device drivers 315 to interface to external peripherals such as input/output devices.

Figure 4:
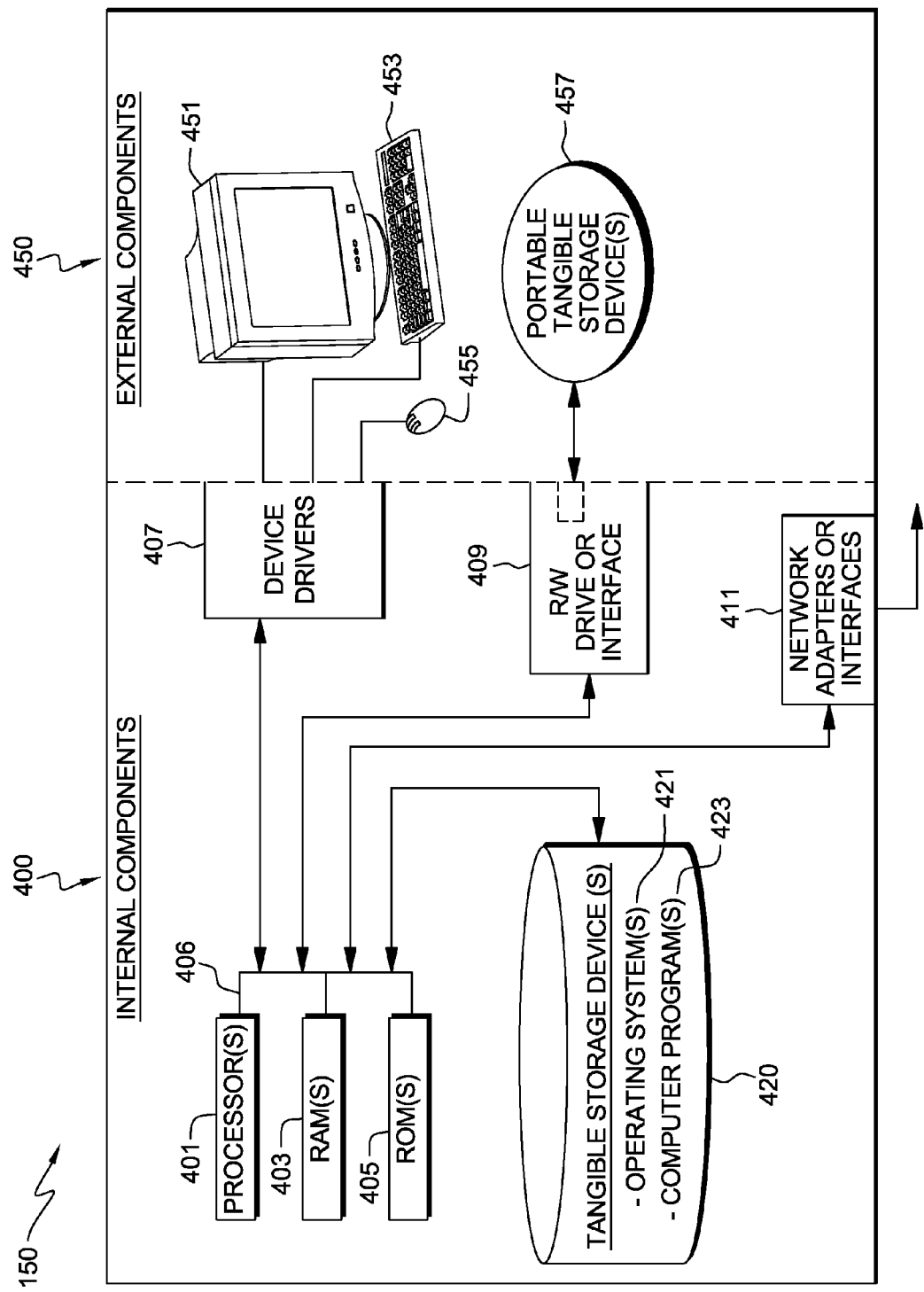
FIG. 4 is a block diagram illustrating internal and external components of the service server presented in FIGS. 1A and 1B, in accordance with an exemplary embodiment of the present invention.

FIG. 4 is a block diagram illustrating internal components 400 and external components 450 of service server 150 presented in FIGS. 1A and 1B, in accordance with an exemplary embodiment of the present invention. Internal components 400 include, on one or more buses 406, one or more processor(s) 401, one or more computer-readable RAM(s) 403, and one or more computer-readable ROM(s) 405. Operating system(s) 421 and computer program(s) 423 are located on one or more computer-readable tangible storage device(s) 420. Computer program(s) 423 include connecting program 151. Internal components 400 also includes R/W drive or interface 409 to read from or write to external storage devices, network adapters or interfaces 411 for wired or wireless communication links, and device drivers 407 to interface to external peripherals such as external input/output devices. External components 450 include computer display monitor 451, keyboard 453, computer mouse 455, and portable tangible storage device(s) 457.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for automatically connecting a calling device to a best available calling device based on resource strength, the method comprising steps of:
    a computer system receiving from a first calling device a request for a call to a second calling device;
    the computer system evaluating resource strength of the second calling device, the resource strength of the second calling device including at least one of strength of signals, power levels, and calling minute availability;
    the computer system determining one or more third calling devices, in response to determining that the resource strength of the second calling device is low;
    the computer system comparing resource strength of the one or more third calling devices with the resource strength of the second calling device, the resource strength of the one or more third calling devices including at least one of strength of signals, power levels, and calling minute availability;
    the computer system determining a best available one of the one or more third calling devices;
    the computer system determining whether resource strength of the best available one is better than the resource strength of the second calling device;
    the computer system receiving, from the first calling device, authorization to be connected to the best available one of the one or more third calling devices;
    the computer system receiving, from the best available one of the one or more third calling devices, a response of accepting the call from the first calling device; and
    the computer system connecting the call by connecting the first calling device and the best available one of the one or more third calling devices.

2. The method of claim 1, wherein the first calling device is used by a caller, the second calling device is used by a receiver, and the one or more third calling devices are used by respective third users who are related to both the caller and the receiver and are in proximity to the receiver.

3. The method of claim 1, further comprising the step of:
    the computer system connecting the first calling device to the second calling device, in response to determining that the resource strength of the second calling device is not low.

4. The method of claim 1, further comprising the step of:
    the computer system connecting the first calling device to the second calling device, in response to determining that the resource strength of the one or more third calling devices is not better than that of the second calling device.

5. The method of claim 1, further comprising the step of:
    the computer system connecting the first calling device to the second calling device, in response to determining that the one or more third calling devices are not available.

6. The method of claim 1, further comprising the step of:
    the computer system determining a location of the second calling device and locations of the one or more third calling devices.

7. A computer program product to automatically connect a calling device to a best available calling device based on resource strength, the computer program product comprising:
    one or more computer-readable tangible storage devices and program instructions stored on at least one of the one or more tangible storage devices, the program instructions comprising:
    program instructions to receive from a first calling device a request for a call to a second calling device;
    program instructions to evaluate resource strength of the second calling device, the resource strength of the second calling device including at least one of strength of signals, power levels, and calling minute availability;
    program instructions to determine one or more third calling devices, in response to determining that the resource strength of the second calling device is low;
    program instructions to compare resource strength of the one or more third calling devices with the resource strength of the second calling device, the resource strength of the one or more third calling devices including at least one of strength of signals, power levels, and calling minute availability;
    program instructions to determine a best available one of the one or more third calling devices;
    program instructions to determine whether resource strength of the best available one is better than the resource strength of the second calling device;
    program instructions to receive, from the first calling device, authorization to be connected to the best available one of the one or more third calling devices;
    program instructions to receive, from the best available one of the one or more third calling devices, a response of accepting the call from the first calling device; and
    program instructions to connect the call by connecting the first calling device and the best available one of the one or more third calling devices.

8. The computer program product of claim 7, wherein the first calling device is used by a caller, the second calling device is used by a receiver, and the one or more third calling devices are used by respective third users who are related to both the caller and the receiver and are in proximity to the receiver.

9. The computer program product of claim 7, further comprising:
  program instructions to connect the first calling device to the second calling device, in response to determining that the resource strength of the second calling device is not low.

10. The computer program product of claim 7, further comprising:
  program instructions to connect the first calling device to the second calling device, in response to determining that the resource strength of the one or more third calling devices is not better than that of the second calling device.

11. The computer program product of claim 7, further comprising:
  program instructions to connect the first calling device to the second calling device, in response to determining that the one or more third calling devices are not available.

12. The computer program product of claim 7, further comprising:
  program instructions to determine a location of the second calling device and locations of the one or more third calling devices.

13. A computer system for automatically connecting a calling device to a best available calling device based on resource strength, the computer system comprising:
  one or more processors, one or more computer-readable tangible storage devices, and program instructions stored on at least one of the one or more storage devices for execution by at least one of the one or more processors, the program instructions comprising:
    program instructions to receive from a first calling device a request for a call to a second calling device;
    program instructions to evaluate resource strength of the second calling device, the resource strength of the second calling device including at least one of strength of signals, power levels, and calling minute availability;
    program instructions to determine one or more third calling devices, in response to determining that the resource strength of the second calling device is low;
    program instructions to compare resource strength of the one or more third calling devices with the resource strength of the second calling device, the resource strength of the one or more third calling devices including at least one of strength of signals, power levels, and calling minute availability;
    program instructions to determine a best available one of the one or more third calling devices;
    program instructions to determine whether resource strength of the best available one is better than the resource strength of the second calling device;
    program instructions to receive, from the first calling device, authorization to be connected to the best available one of the one or more third calling devices;
    program instructions to receive, from the best available one of the one or more third calling devices, a response of accepting the call from the first calling device; and
    program instructions to connect the call by connecting the first calling device and the best available one of the one or more third calling devices.

* * * * *